Nov. 27, 1928.

J. L. PETERSON 1,692,859

CHANGE SPEED TRANSMISSION MECHANISM

Filed Dec. 30, 1926  5 Sheets-Sheet 1

Nov. 27. 1928.
J. L. PETERSON
1,692,859
CHANGE SPEED TRANSMISSION MECHANISM
Filed Dec. 30, 1926    5 Sheets-Sheet 2
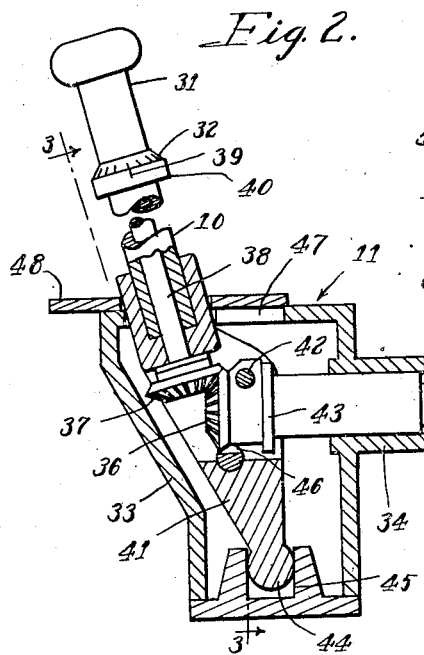
Fig. 2.
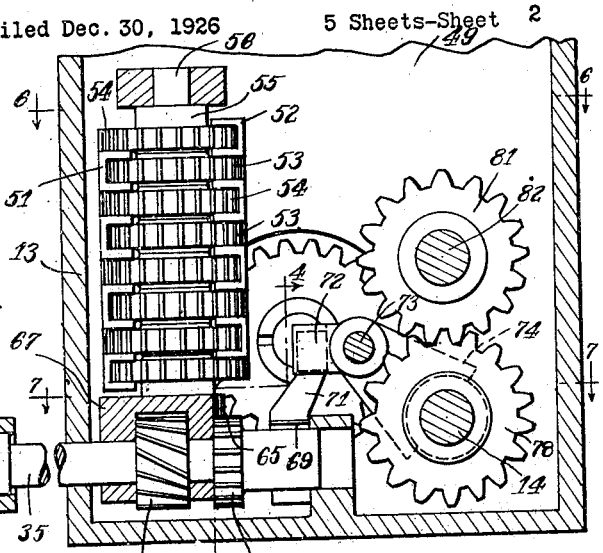
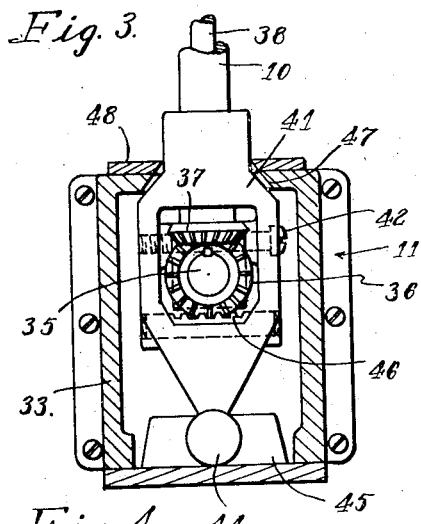
Fig. 3.
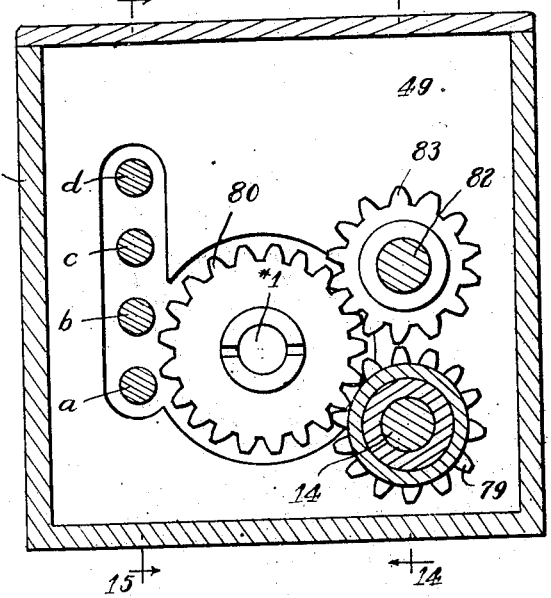
Fig. 5.
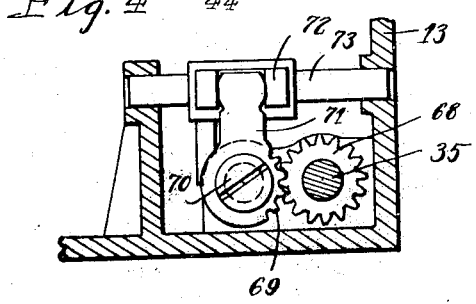
Fig. 4
Inventor:
Juel L. Peterson
By Wilson & McCanna
Attys.

Nov. 27, 1928.  1,692,859
J. L. PETERSON
CHANGE SPEED TRANSMISSION MECHANISM
Filed Dec. 30, 1926   5 Sheets-Sheet 3
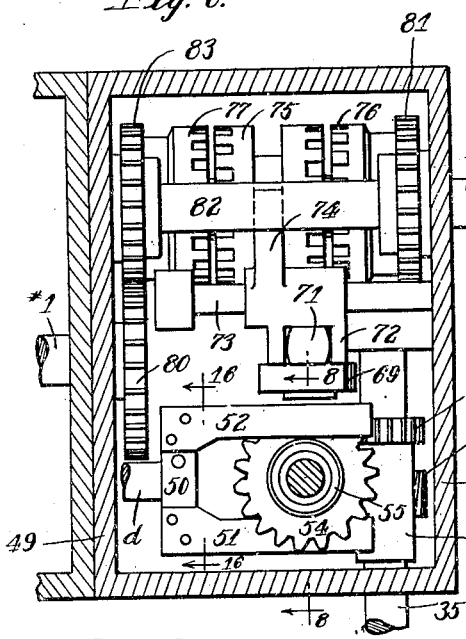
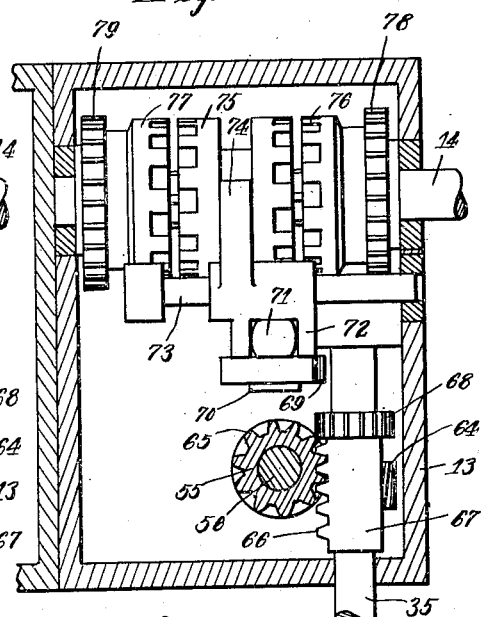
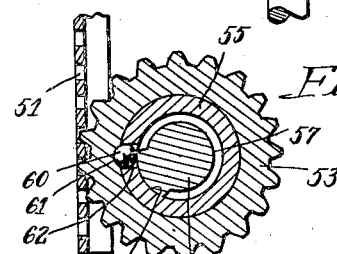
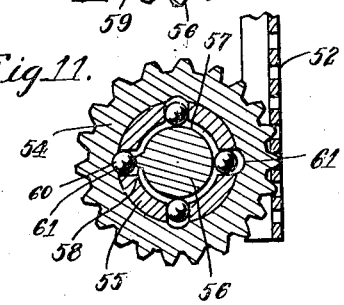
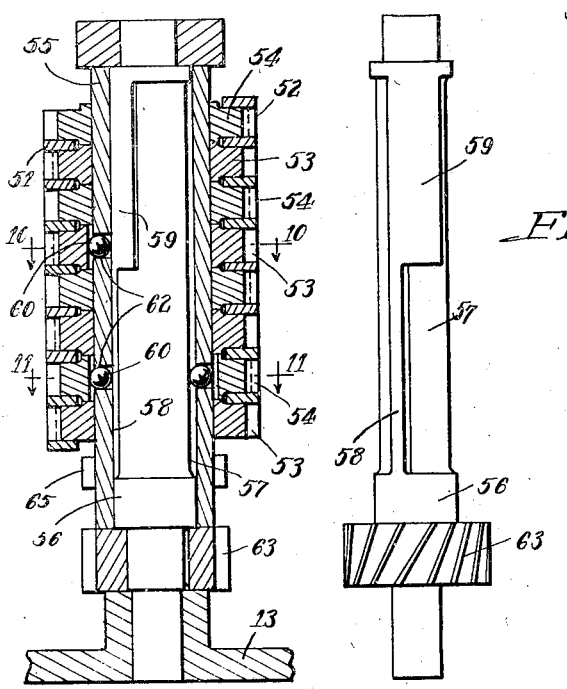

Nov. 27, 1928.
J. L. PETERSON
1,692,859
CHANGE SPEED TRANSMISSION MECHANISM
Filed Dec. 30, 1926  5 Sheets-Sheet 4
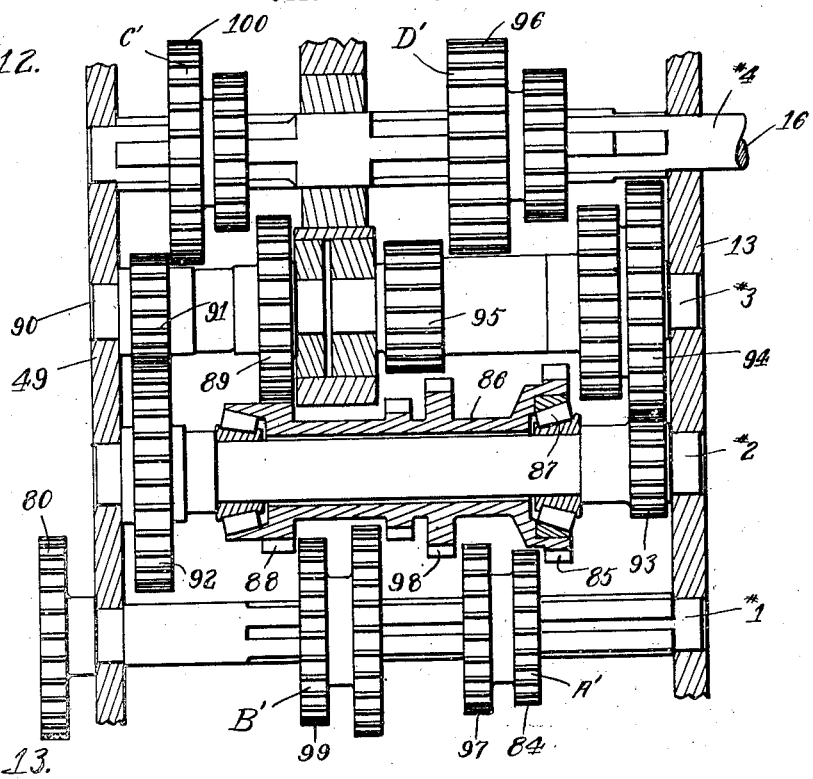
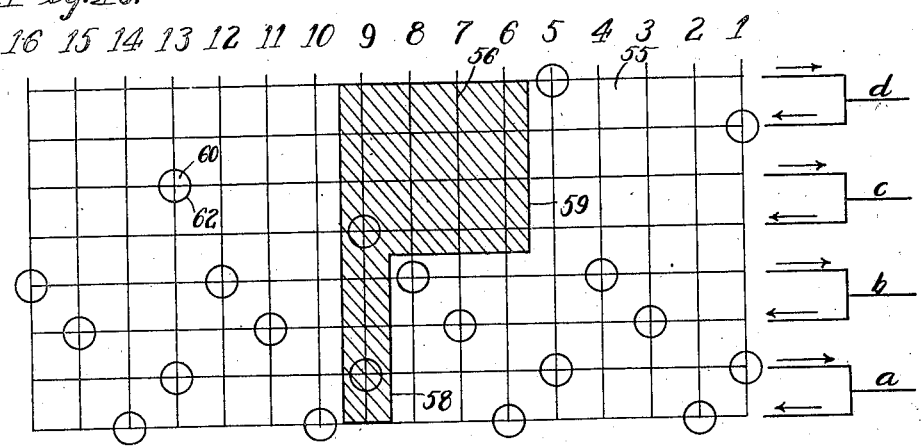
Inventor:
Juel L. Peterson
By Wilson & McCanna
Attys.

Nov. 27, 1928. 1,692,859
J. L. PETERSON
CHANGE SPEED TRANSMISSION MECHANISM
Filed Dec. 30, 1926 5 Sheets-Sheet 5

Inventor:
Joel L. Peterson
By Wilson & McCanna
Attys.

Patented Nov. 27, 1928.

1,692,859

UNITED STATES PATENT OFFICE.

JUEL L. PETERSON, OF ROCKFORD, ILLINOIS.

CHANGE-SPEED-TRANSMISSION MECHANISM.

Application filed December 30, 1926. Serial No. 157,890.

This invention relates to change-speed transmission mechanisms generally but is particularly concerned with a novel single lever controlled sliding gear transmission especially designed and adapted for application to machine tools where it affords the required selectivity of speeds, enables starting and stopping at will, and permits reversing the direction of drive.

One of the principal objects of the invention is to provide a single lever control unit of improved design and construction wherein the turning of a knob serves in selecting the speed, the movement of the lever in one direction serves to shift the selected gears, and the movement of the lever sidewise serves to shift clutches for either forward or reverse drive, the mid position of the lever being neutral so that the machine may be stopped and started at will by movement of the lever to and from this position. In connection with the speed selecting means referred to, there is provided a means for locking the same operative when the control lever is moved forward to shift the selected gears to avoid any accidental turning of the aforesaid knob once a certain selection of gears has been made.

Another important object of the invention is to provide gear shifting means and clutch shifting means of an improved design and construction for operation by the single lever control unit, both of said means being positive in operation while sensitive to such an extent that any desired speed forward or reverse in a range of as many as sixteen speeds may be selected and the proper gears and clutch shifted with facility and accuracy. An important advantage lies in the fact that the direction of drive may be changed at will or the machine may be stopped without disturbing the gears selected.

The invention embraces still further objects and advantages discussed more fully in the following detailed description in which reference is made to the accompanying drawings, wherein—

Fig. 2 is a vertical section through the single lever control unit and the end of the gear box taken on lines 2—2 of Figs. 1 and 14 looking in the directions indicated by the arrows;

Fig. 3 is a transverse section through the single lever control unit taken on the line 3—3 of Fig. 2;

Fig. 4 is a transverse vertical sectional detail taken on the line 4—4 of Fig. 2 to show the clutch shifting means;

Fig. 5 is a vertical section through the gear box taken on the line 5—5 of Fig. 14 to show in conjunction with Fig. 2 the reverse gearing in the gear box;

Figure 1:
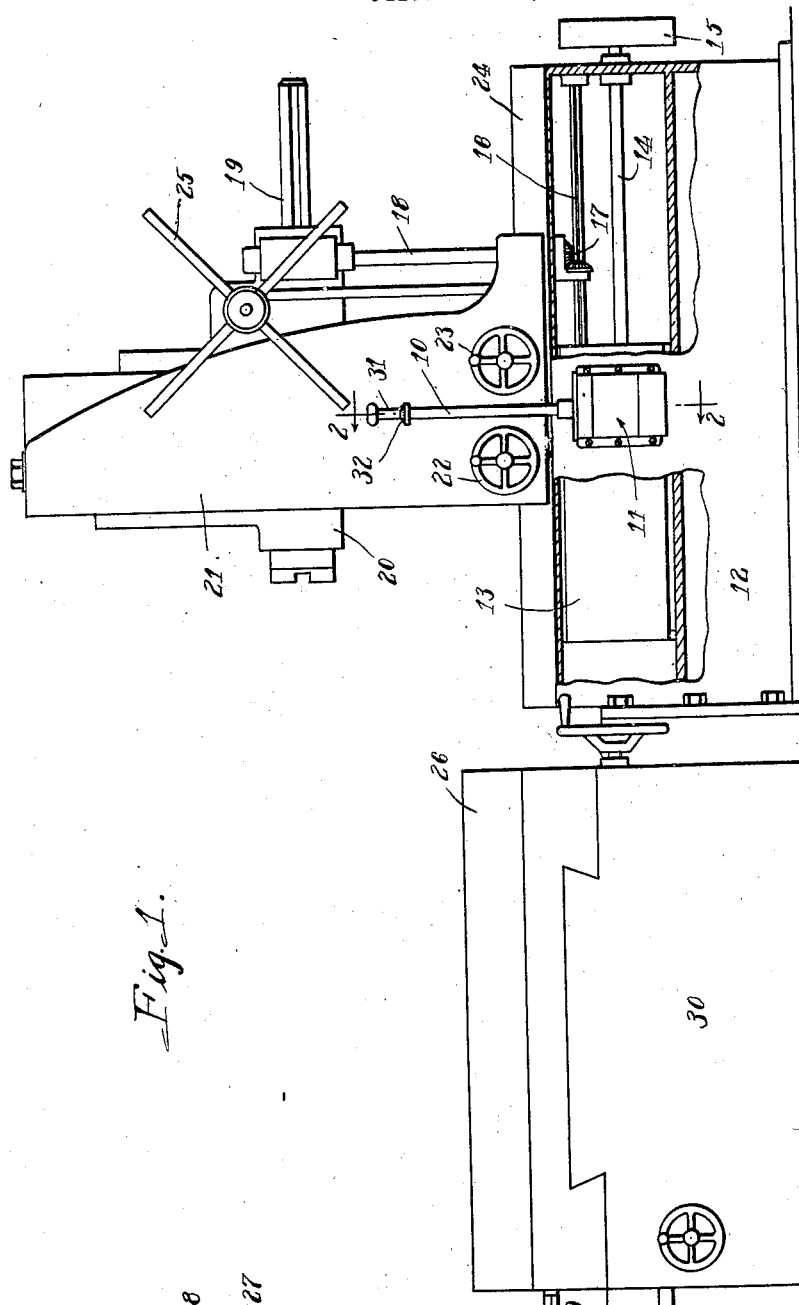
Figure 1 is a front view of a universal boring machine equipped with my improved transmission to afford single lever control of the speed and direction of drive of the boring spindle.
Figure 14:
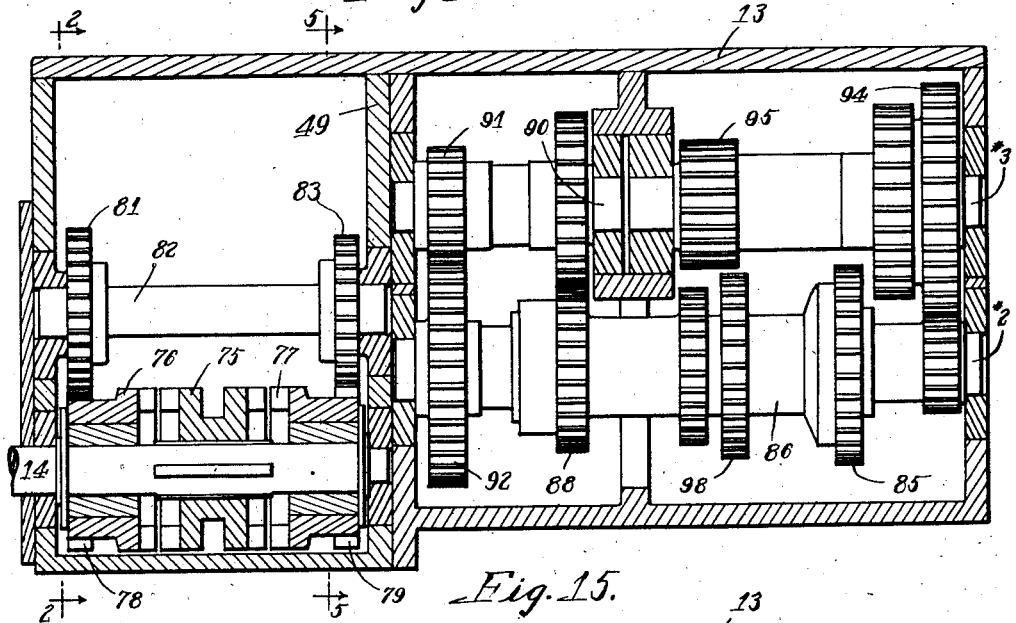
Figure 15:
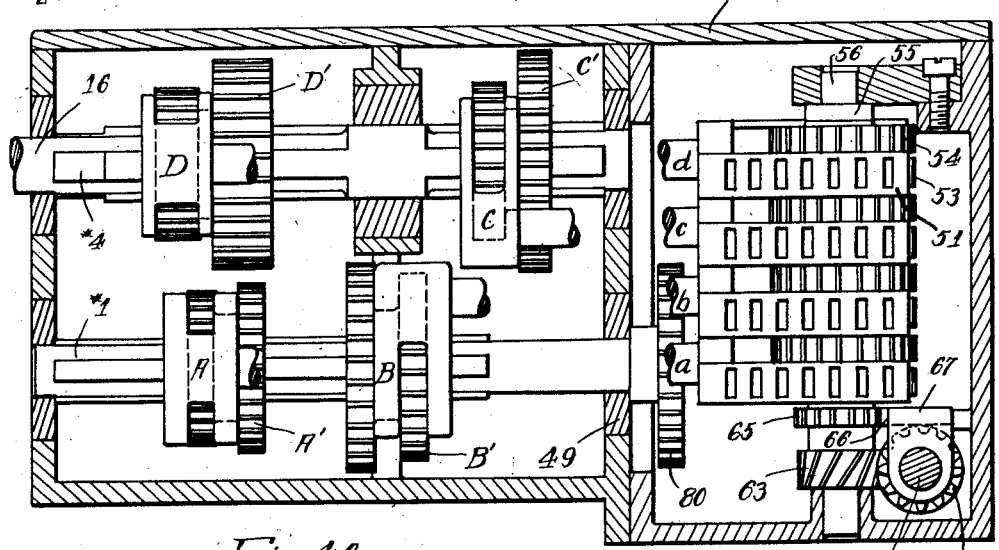
Figure 16:
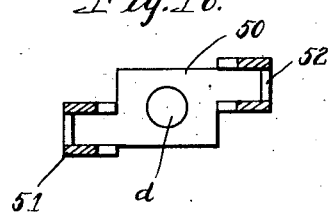

Figs. 6 and 7 are horizontal sections taken on the lines 6—6 and 7—7 of Fig. 2 showing the gear shifting and clutch shifting mechanism disposed in the same part of the gear box with the reverse gearing;

Fig. 8 is a vertical section taken on the line 8—8 of Fig. 6 looking in the direction indicated by the arrows and showing the tumbler operating cam by means of which any two gear shifting rods of the four rods used may be selected and operated in either direction;

Fig. 9 is an elevational view of the cam removed and shown turned about to better illustrate the cam surfaces for actuating the tumblers;

Figs. 10 and 11 are horizontal sections taken on the lines 10—10 and 11—11 of Fig. 8 to better illustrate the way in which the tumblers are actuated;

Fig. 12 is a developed section of the change-speed gearing, the four parallel shafts being shown in one plane for the purposes of illustrating the relationship between certain gears so that gear trains for different speeds may be followed through in this view;

Fig. 13 is a diagrammatic chart comprising in effect a developed view of the tumbler sleeve on which is superposed a developed view of the cam surfaces of the tumbler actuating cam, the cam in the particular position shown serving to select gears for the ninth speed of the range of sixteen speeds, all of which may be traced in Fig. 12 by use of this chart;

Figs. 14 and 15 are vertical sections taken in the planes of the lines 14—14 and 15—15 of Fig. 5 looking in the directions indicated by the arrows; and Fig. 16 is a sectional detail taken on the lines 16—16 of Fig. 6 and serving to illustrate the form of the cross-heads on the shifter rods on which the racks are mounted by means of which the rods are operated in either direction.

The same reference numerals are applied to corresponding parts throughout the views.

The transmission mechanism of the present invention is herein illustrated as applied to a universal boring machine but it should be understood that it is in no way limited to any special application of this kind inasmuch as the present transmission is designed to be used on practically any kind of machine tool wherever a single lever control both of the speed and the direction of drive of a driven spindle or the like is desired. In the present embodiment the control lever is shown at 10 extending from the control unit 11 mounted on the side of the base 12 wherein the gear box 13 associated with the control unit is arranged to be housed. Any suitable source of power may be provided for driving the input shaft 14 extending into the gear box 13. In the present case a drive pulley 15 is provided for this purpose. The output shaft 16 extends from the gear box 13 and is suitably splined for driving connection at 17 with the vertical shaft 18 geared to the boring spindle 19. The latter is mounted in a slide 20 vertically adjustable on the column 21. The hand wheel 22 serves for the vertical adjustment of the slide while the hand wheel 23 serves to adjust the column back and forth on its ways 24. The spindle is arranged to be fed lengthwise by means of the large hand wheel 25 relative to a revolving work table 26. The boring bar rotated by the spindle may be supported at the far side of the table 26 in a bearing 27 vertically adjustable in an upright 28 mounted on a supporting arm 29 extending from the base 30 of the revolving table. This brief description of one embodiment of the invention will suffice for the present purposes. The speed, as well as the direction of drive of the spindle 19, is arranged to be controlled by the single control lever 10 and the spindle is furthermore stopped and started by operation thereof. As will presently appear, the handle or knob 31 is arranged to be turned to select the desired speed by reference to the dial 32. The lever 10 is then pushed forward to shift the gears in the gear box 13 which have to be engaged for the speed selected, and finally the lever is swung to one side or the other depending on which direction it is desired to have the spindle driven. Obviously, the operator may reverse the direction of drive at will by swinging the lever from one side to the other past a mid-position. In the mid position, neither one of two clutches by means of which the forward and reverse drives are secured will be engaged and the operator can consequently bring the spindle to a standstill by moving the lever to this neutral position. The machine is, therefore, kept under perfect control at all times and the operator is never apt to become confused as there is only a single lever requiring manipulation. On most machine tools, several levers are usually required in the control of the spindle drive and it is frequently awkward and confusing for the operator to manipulate the same while watching the work.

The control lever 10, as stated before, extends from the control unit 11. The latter appears most clearly in Figs. 2 and 3 and comprises a housing 33 providing a bearing at 34 for a single control shaft 35 extending into one end of the gear box 13. The shaft 35 will be referred to hereinafter as the selector shaft inasmuch as the rotation thereof serves to select for operation certain gears and the movement of the shaft lengthwise serves to engage the selected gears. The selector shaft has a bevel gear 36 keyed to the end thereof within the housing 33 and meshing with a bevel gear 37 fixed on the end of a shaft 38 extending upwardly through the control lever 10. The handle 31, previously referred to, is fixed to the outer end of the shaft 38 and has the dial 32 forming a part thereof. In operation, the selector shaft is turned by means of the handle to select any desired speed and the speed selected is indicated by an index mark 39 on a rim 40 provided on the lever 10 beneath the handle.

The lever 10 is in the retracted mid position shown in Figs. 2 and 3 when the speed is selected but after that it is arranged to be pushed forward to move the selector shaft endwise to shift the selected gears. The lever 10 is, therefore, provided with a rocker yoke 41 pivoted at 42 to a collar 43, in which the selector shaft is rotatable but is not free to have relative endwise movement. The lower end of the yoke 41 is ball-shaped, as shown at 44, and received in a transverse guideway 45 in the bottom of the housing 33. It will thus appear that after the selector shaft has been turned by rotation of the handle 31, the shaft may be moved endwise by pushing the lever 10 forward, in which movement the guideway 45 provides an abutment so that the yoke 41 swings with the lever about the ball end 44 as a pivot while the yoke 41 swings relative to the shaft 35 about the pivot pin 42 as an axis. In this movement of the yoke 41 about the pivot pin 42 the teeth of the bevel gear 36 are brought into mesh with the teeth of a rack 46 fixedly mounted in the yoke 41. Thus the gears 36 and 37 are locked against further rotation by the handle 31 when the control lever 10 is pushed forward to shift the selected gears. So long as the lever is in its forward position, there is no possibility of turning the handle and disturbing the gears selected. Before any change in gears may be made the control lever must be pulled back to its retracted position, as shown in Fig. 2. The locking of the gears 36 and 37 by means of the rack 46 also serves to lock the selector shaft with the yoke 41 so that the shaft may be oscillated through a certain angularity when the control lever 10 is in its forward position. The purpose in this, as will presently appear, is to operate clutches by swinging the control lever to one side or the other from a mid position to secure either forward or reverse drive. The top wall of the housing 33 has a T-shaped slot 47 to guide the control lever in its movement from the retracted position to the forward position and from the forward position sidewise either way from a mid-position. A plate 48 is preferably provided covering the slot 47 to exclude dust and dirt from the housing 33. The plate slides freely on top of the housing and covers the slot in any position of the lever.

The gear shifting means will now be described, reference being had more particularly to Figs. 2, 5 to 11, 15, and 16. Four shifter rods, designated a, b, c, and d are reciprocable in openings in a partition wall 49 in the gear box 13 and connected with shifting yokes designated A, B, C, and D respectively to shift gear clusters A', B', C', and D' respectively, back and forth to complete gear trains for sixteen different spindle speeds in a manner hereinafter described. Each of the shifter rods has a cross-head 50 fixed to the inner end thereof providing a mounting for a pair of racks 51 and 52 preferably of stamped sheet metal and channel-shaped in cross-section, as clearly appears in the drawings. The racks of each pair are disposed in parallel relation but the racks 51 are offset downwardly with respect to the racks 52, as most clearly appears in Fig. 16, so that the rack 51 of each pair meshes with a gear 53 on one side of the axis thereof while the rack 52 of each pair meshes with a gear 54 on the other side of the axis, the gears being in superposed coaxial relation, as shown. Four pairs of gears and racks meshing therewith are provided for the four shifter rods. I employ means for selectively clutching two gears from different pairs so that two shifter rods may be shifted simultaneously either in the same direction or in opposite directions. The gears are always rotated in a counterclockwise direction, as viewed in Fig. 6, in the engaging movement and in a clockwise direction in the disengaging movement. Thus, if the gear 53 of any one of the four pairs of gears is clutched, in a manner presently to appear, and rotated in a counter-clockwise direction as viewed in Fig. 6, the shifter rod associated therewith will be pulled to the right through the rack connection 51 whereas if the gear 53 of the same pair of gears were clutched and rotated in the same direction, the same shifter rod would be pushed to the left by reason of the rack 52 being on the other side of the axis from the rack 51. The four pairs of gears 53 and 54 are all stacked on a sleeve 55 mounted on a cylindrical cam 56 received in suitable bearings in the gear box. The cam 56 is relieved peripherally within the sleeve, as indicated at 57, so as to leave raised cam surfaces at 58 and 59. These cam surfaces are arranged to cause tumbler balls 60 to be moved out into recesses 61 provided in the gears 53 and 54. The tumblers are received in openings 62 provided in the wall of the sleeve 55, the sleeve serving, therefore, as a cage to maintain the tumblers in their proper positions of angularity relative to the cam 56. As seen in Fig. 11, the tumblers, when not extended to clutching position, are received freely in the cage openings 62 and the relieved portion 57 of the cam 56. In other words, when the tumblers are not extended to clutching position, free rotation of the sleeve 55 with the cam 56 will be permitted but when a tumbler is extended to clutching position, as shown in Figs. 10 and 11, the rotation of the sleeve 55 with the cam 56 will cause rotation of whichever gears are clutched, the other gears remaining idle. When one gear of a pair has been clutched and is turned, the other gear of the same pair will obviously turn idly relative to the sleeve and cam. The cam 56 is shown developed in Fig. 13 and superposed on a developed view of the sleeve 55, the tumbler balls 60 being shown in their cage openings 62 in the same view so that the figure serves as a chart in determining which tumblers are extended to clutching position for different spindle speeds. The cam 56 is shown in cross-section and the surfaces 58 and 59 thereof have extended two tumbler balls associated with the shifter rods a and c to shift gears for the ninth of the series of sixteen speeds. By moving the cross-hatched cam area to different positions on the chart corresponding with different angular positions of adjustment of the cam in the actual machine, the tumbler balls that have to be extended to clutching position for different spindle speeds will be readily determined and from this is determined which shifting rod is moved and in what direction, the directions being indicated by the arrows at the right of the figure. The chart will be referred to again in a discussion of the novel gearing which I prefer to employ in conjunction with my improved transmission mechanism. It will now be observed that the cam 56 has a spiral gear 63 keyed thereon and meshing with a spiral gear 64 mounted on the selector shaft 35. Thus the turning of the selector shaft by the handle 31 rotates the gear 64 and, through the meshing engagement of the latter with the gear 63, the cam 56 is turned through a certain angularity relative to the sleeve 55 to clutch two gears 53 or 54 of two different pairs so that upon the rotation of the sleeve 55 with the cam 56 the two gears that have been clutched will be rotated and cause two of the shifter rods to be shifted either in the same direction or in opposite directions, depending, on the particular gears clutched. The rotation of the sleeve 55 with the cam 56 is secured by providing gear teeth 65 on the lower end thereof over the gear 63 and meshing with rack teeth 66 provided on the side of a yoke 67 mounted on the selector shaft 35 about the gear 64. Thus, in the movement of the selector shaft 35 endwise, which, as described above, is produced by pushing the control lever 10 forward, the gear 64 rotates the gear 63 and hence rotates the cam 56 while at the same time the rack 66 rotates the sleeve 55 by meshing engagement with the gear teeth 65 provided on the latter. The movement of the control lever 10 forward has, therefore, resulted in the shifting of certain selected gears for a certain predetermined speed. I will now describe the means employed whereby a movement of the control lever to one side or another from a mid, neutral position serves to shift the proper clutch for forward or reverse drive.

The selector shaft has a spur gear 68 mounted thereon in front of the yoke 67, previously referred to. When the selector shaft is moved forward, as just described above, the gear 68 comes into mesh with a sector gear 69 mounted on a stud 70. The sector gear has an arm 71 extending therefrom and engaged in a shifter fork 72 reciprocable on a cross-rod 73 received in suitable bearings in the gear box. The shifting fork 72 has a yoke 74 thereon for shifting a clutch collar 75 into engagement with either of two clutch faces 76 and 77 provided on gears 78 and 79, respectively. The gears 78 and 79 are mounted freely on the end of the input shaft 14 while the clutch collar 75 is splined on said shaft and serves, therefore, to transmit the drive to either of the two gears when clutched therewith. A direct drive from the input shaft 14 to the drive shaft of the change-speed gearing in the gear box, designated #1, results when the gear 79 is clutched to the shaft 14 inasmuch as this gear is in meshing relation with the gear 80 fixed on the drive shaft #1. An indirect reverse drive results when the gear 78 is clutched to the shaft 14 by reason of the fact that this gear meshes with a gear 81 fixed on a counter shaft 82 so as to communicate drive to the gear 80 through an intermediate gear 83 meshing with the latter and fixed on the counter shaft. It will, therefore, be clear that the swinging of the control lever 10 to one side from its neutral position will give a drive in one direction and that a reverse drive is secured by swinging the control lever to the other side. The oscillation of the selector shaft 35 required in the shifting of the clutches is so slight as not to affect the gear shifting mechanism by reason of the oscillation of the gear 64 with the selector shaft. It will, furthermore, be clear that there is no likelihood of stripping gears with the present invention inasmuch as the drive shaft #1 of the transmission is out of driving relation to the input shaft 14 during the shifting of the gears into or out of mesh and, by reason of the special selector mechanism above described, it is possible to have only certain gears engaged for one certain speed at a time, and there is positively no danger of jamming or otherwise causing a breakage of parts of the transmission. In single lever controlled transmissions available in the past, it was necessary to have the gears rotating at the time of shifting the same in order to obtain engagement. On this account, these previous types of transmissions could be used only with relatively slow speeds as, for example, in feed drives. High speeds could not be handled as, for example, spindle drives on machine tools, because of the danger of a severe clashing of gears if it were attempted to engage gears turning at a high velocity. By reason of the fact that the present invention provides for the shifting of idle gears and that the power transmitting clutch is engaged only after a selected gear train has been thrown into action, the application of the present invention is not limited to any particular drive speeds or to any particular usage.

Referring now to Figs. 12 to 15, it will be noted that four shafts are employed for the gears in the gear box 13, designated #1, #2, #3, and #4, #1 having been previously referred to as the drive shaft of the change-speed gearing bearing the gear 80 while #4 is the driven shaft and may be coupled with or form an extension of the output shaft 16. The gear clusters A' and B' are splined on the drive shaft #1 while the gear clusters C' and D' are splined on the driven shaft #4. In the first and lowest speed, the gear cluster A' is moved to the right by the shifter rod a (see Fig. 13) while the gear cluster D' is moved to the left by the shifter rod d. The gear 84 is thus meshed with the gear teeth 85 provided on a sleeve 86 mounted suitably on anti-friction bearings 87 on the intermediate shaft #2. The sleeve 86 has gear teeth 88 constantly in mesh with a gear 89 fixed on a stub shaft 90 coaxial with the intermediate shaft #3. Another gear 91, fixed on the stub shaft 90, transmits the drive to the intermediate shaft #2 by meshing engagement with the gear 92 fixed on the latter. Another gear 93 fixed on shaft #2 drives a gear 94 mounted on shaft #3. Another gear 95 fixed on the same shaft with the gear 94 meshes with the gear 96 of the gear cluster D'. The train completed by meshing the gear 84 with the gear 85 and the gear 96 with the gear 95 is as follows: 84 to 85, 88 to 89, 91 to 92, 93 to 94, and finally 95 to 96. For the second speed the gear cluster D' is left in the same position and the gear cluster A' is shifted to the left (see Fig. 12) by a corresponding movement of the shifter rod a (see Fig. 13). In other words, the gear 97 of the gear cluster A' is meshed with the gear teeth 98 on the sleeve 86 and a gear train somewhat similar to the one last traced results, the speed being stepped up proportionately to the difference between the ratios between the gears 84 and 85 on the one hand and the gears 97 and 98 on the other hand. For the third speed the gear cluster A' is in the neutral position shown in Fig. 12 but the gear cluster B' is moved to the left by a corresponding movement of the shifter rod b (see Fig. 13), the gear cluster D' still having its gear 96 in mesh with the gear 95 in agreement with the chart in Fig. 13. Accordingly, the gear 99 of the gear cluster B' is meshed with the gear teeth 88 and the resulting train is as follows: 99 to 88, 88 to 89, 91 to 92, 93 to 94, and finally 95 to 96. It is believed a tracing of the speeds will suffice to demonstrate the manner of operation of the change-speed gearing and also to indicate how the different speeds may be traced from the chart. Inasmuch as the cam 56 is shown in Fig. 13 at a position corresponding to the ninth speed, this speed will also be traced. In this speed the gear cluster A' is moved to the right by a corresponding movement of the shifter rod a, as indicated by the arrow in Fig. 13, while the gear cluster C' is moved to the left by a corresponding movement of shifter rod c. Accordingly, the gear 84 is meshed with the gear teeth 85 on the sleeve 86 and the gear 100 is meshed with the gear 91 and the following gear train results: 84 to 85, 88 to 89, and finally 91 to 100. By reason of the use of the sleeve 86 through which the drive is transmitted, I have been enabled to reduce the size of the gears employed and have correspondingly cut down the overall dimensions of the gear box so that the present gearing is particularly well adapted for application to machine tools where the gear box space is frequently rather limited. The reduction in the size of the gears also means a considerable saving in the cost of production.

While I have described my invention as applied in one special embodiment, it will, of course, be understood that the same is capable of various applications and, in fact, is not limited to use with machine tools but may be used in any mechanism where variations in drive speeds are required. Furthermore the application of the present transmission is not limited to rotating elements but may also be used to communicate variable linear speeds as it will be obvious that the rotary motion of the driven shaft may be translated into linear motion as, for example, in wiredrawing machines. Another phase in which the invention is capable of considerable variation is in the number of drive speeds which may be afforded thereby and it should, therefore, be distinctly understood that the present invention is in no way limited to the provision of sixteen drive speeds inasmuch as minor variations in the mechanism will readily afford a greater or smaller number of speeds. It is, therefore, the intention in the appended claims to cover all legitimate modifications, adaptations, and variations coming within the spirit and scope of my invention.

I claim:

1. In a transmission mechanism the combination with a set of change-speed gears, of a selector shaft arranged to be rotated to different angularities for the selection of gear trains for different speeds, a knob for turning said shaft, means for indicating the speed selected, a single control lever mounted for swinging movement back and forth and transversely arranged when swung in one direction to move the selector shaft endwise, means operated by the endwise movement of said shaft for throwing the selected gears into action, the return movement of said lever being arranged to cause the return of the selector shaft to throw the selected gears out of action, and clutching means operable in the transverse movement of said control lever to transmit drive to the selected gears.

2. A transmission mechanism as set forth in claim 1, wherein the clutching means comprises two clutches affording a forward and reverse drive, one of said clutches being engaged in the transverse movement of said control lever one way, and the other being engaged by movement thereof in the other direction, the intermediate position of said lever corresponding to the disengaged position of both clutches.

3. In a transmission mechanism, the combination with a set of change-speed gears, of a selector or control shaft arranged to be rotated to different angularities for the selection of gear trains for different speeds, means under manual control adapted for successively turning said shaft, then moving the shaft endwise, and thereafter again turning the shaft, means operated in the first movement to select certain gears for action, means operated in the second movement to engage the selected gears, and clutching means operated in the third movement to transmit drive to the selected gears.

4. A transmission mechanism as set forth in claim 3, wherein the manually operable means comprises a single control member for operating the selector shaft in the ways described, and wherein the clutching means comprises two clutches providing a forward and a reverse drive, the latter being operable by a movement of said control member in one direction to engage the clutch for the forward drive and being operated by the movement of the control member in another direction to engage the clutch for the reverse drive, there being an intermediate position of the control member wherein neither clutch is engaged.

5. In a control mechanism of the character described, the combination with a set of transmission gears, of a single control lever mounted for swinging movement, gear shifting means for completing different gear trains for different drive speeds, manually operable means associated with said gear shifting means for selecting any certain gear train to secure a predetermined drive speed, a shaft arranged to be moved by a swinging movement of said control lever to operate said gear shifting means to throw the selected gears into condition for action, and clutching means operable by a further movement of said shaft produced by a further swinging movement of said lever to transmit power to the selected gear train, said lever being arranged at will to be swung back to a neutral position to disconnect the power transmission without disturbing the selected gears.

6. In a transmission mechanism as set forth in claim 5, wherein the gear shifting means is operated by endwise movement of said shaft communicated by a swinging movement of said lever in one direction, and wherein said clutch shifting means is operated by the turning of said shaft communicated by a transverse swinging movement of said lever, means rendering the last means operative only after the endwise movement of said shaft whereby to predetermine the sequence of operation.

7. In a transmission mechanism as set forth in claim 5, wherein the gear shifting means is operated by endwise movement of said shaft communicated by a swinging movement of said control lever in one direction, means rendered effective after the endwise movement of said shaft to lock the shaft to the lever and thereby prevent operation thereof independently of the lever for the purpose described.

8. In a transmission mechanism as set forth in claim 5, wherein the gear shifting means is operated by endwise movement of said shaft communicated by a swinging movement of said control lever in one direction, means rendered effective after the endwise movement of said shaft to prevent further operation of the manually operable speed selecting means by locking said shaft against relative rotation with respect to said lever, the shaft being thereby arranged to be turned by a transverse swinging movement of said lever, and said clutch shifting means being arranged to be operated by a turning movement of said shaft.

9. In a transmission mechanism of the character described, the combination with a set of change-speed gears, of a single control lever mounted for swinging movement back and forth, a selector shaft, a knob on said lever having connection with said shaft to turn the same to any desired angularity to secure a predetermined drive speed, means operated by the rotation of said shaft for selecting for action certain gears of the change-speed gear set, a connection between said shaft and said lever for communicating endwise movement to the shaft by a swinging movement of said lever, and means operated by said shaft in its endwise movement for shifting into condition for action the gears selected.

10. In a transmission mechanism as set forth in claim 9, wherein the control lever is mounted for swinging movement back and forth and in a transverse direction, clutching means for transmitting power to the gears selected operable by a turning movement of said selector shaft, and a connection between said shaft and said lever for turning said shaft by a transverse swinging movement of said lever.

11. In a transmission mechanism as set forth in claim 9, wherein the control lever is mounted for movement back and forth and transversely, means effective after the selector shaft has been moved endwise by a swinging movement of said lever in one direction to lock said shaft against rotation with respect to said lever whereby to permit the turning of said shaft by transverse swinging movement of said lever, and clutching means operated by the turning movement of said selector shaft to transmit power to the selected gear train.

12. In a transmission mechanism, the combination with a set of change-speed gears, of a selector or control shaft arranged to have endwise and rotational movement for selecting and engaging gear trains for different speeds, means under manual control for selectively communicating one kind of movement to said shaft and then the other, means operated in one kind of movement of the shaft to select certain gears for action, means operated in the other kind of movement of the shaft to engage the selected gears, and clutching means operable subsequently in another movement of the shaft similar to the first movement to transmit drive to the selected gears.

13. A transmission mechanism as set forth in claim 12 wherein the manually operable means comprises a single control member for operating the selector shaft in the ways described, and wherein the clutching means comprises two clutches providing a forward and a reverse drive, the latter being operable by a movement of said control member in one direction to engage a clutch for the forward drive and being operable by the movement of the control member in another direction to engage the clutch for the reverse drive, there being an intermediate neutral position of the control member wherein neither clutch is engaged.

14. In a transmission mechanism, a single lever control unit comprising a support, a selector shaft mounted for rotation and endwise movement on said support and arranged to be extended to a gear box, a single control lever having a yoke portion receiving the end of said selector shaft and having an extension thereof bearing against a portion of said support as an abutment, said shaft being normally free to rotate with respect to said yoke but being held against endwise movement relative thereto, and said yoke being pivoted relative to said shaft to swing on an axis transverse to the axis of the shaft, and a knob on said lever having connection with said shaft for turning the same, said shaft being arranged to be moved endwise by a swinging movement of said lever.

15. In a structure as set forth in claim 14, the provision of means for locking said shaft against rotation relative to said yoke after the swinging movement of the latter, said shaft being thereby arranged to be turned by a swinging movement of said lever in a transverse direction.

16. In a structure as set forth in claim 14 wherein the connection between said knob and said selector shaft comprises a gear fixed on said shaft, another gear meshing therewith, and a shaft fixed to said last mentioned gear and extending through said control lever and connected with said knob at the outer end of said lever whereby the knob serves as a handle.

17. In a structure as set forth in claim 14 wherein the connection between said knob and said selector shaft comprises a gear fixed on said shaft, another gear meshing therewith, and a shaft fixed to said last mentioned gear and extending through said control lever and connected with said knob at the outer end of said lever whereby the knob serves as a handle, the provision of means effective after the swinging movement of said lever for producing the endwise movement of said shaft to lock one of said intermeshing gears against rotation with respect to said yoke whereby to fix the selector shaft against rotation with respect to said yoke and permit the turning of said shaft by transverse swinging movement of said lever.

18. In a transmission mechanism, the combination with a set of change-speed gears, of gear shifting means comprising a shifter rod arranged to have push and pull movement to complete different gear trains for different drive speeds, a cross-head on said rod, a pair of opposed parallel racks mounted on said cross-head, one of which is arranged to communicate the push movement and the other the pull movement to said rod, a pair of gears one of which meshes with one rack on one side of its axis of rotation and the other of which meshes with the other rack on the other side of the axis, and means for clutching either gear and rotating the same, either gear when clutched being rotated in the same direction for the gear engaging movement of said shifter rod.

19. In a structure as set forth in claim 18, the provision of the pair of gears arranged coaxially for separate operation by a common means, said racks meshing therewith being in offset relation whereby to permit the meshing engagement of one rack with one of said gears and the meshing engagement of the other rack with the other gear.

20. In a structure as set forth in claim 18 wherein the pair of gears are coaxially arranged for separate operation by a common means, the provision of a sleeve providing a mounting for said gears, clutching elements operating through openings in said sleeve for selectively clutching either gear for rotation with said sleeve, means within said sleeve arranged to operate the clutching elements, and means for rotating said sleeve.

21. In a structure as set forth in claim 18 wherein the pair of gears are coaxially arranged for separate operation by a common means, the provision of a sleeve providing a mounting for said gears, clutching elements operating through openings in said sleeve for selectively clutching either gear for rotation with said sleeve, a cam mounted within said sleeve for rotation with respect thereto whereby to operate the clutching elements to clutch either gear, and means for rotating said sleeve and cam together after the clutching of one of said gears.

22. In a transmission mechanism of the character described, the combination with a set of change-speed gears, of gear shifting means comprising a plurality of shifter rods arranged to have push and pull movements whereby to complete different gear trains for different drive speeds, a set of shifter rod operating elements including a pair of elements for each rod, either element of the pair being arranged to shift the rod and return the same to neutral, the one being arranged to push the rod for engagement and to pull the same for disengagement of the gears, and the other being arranged to operate in the reverse manner, means for selectively clutching a plurality of said operating elements with a plurality of said shifter rods, only one operating element in any pair associated with a given rod being clutched for operation at a time, and means for operating the clutching elements together whereby simultaneously to shift a plurality of the shifter rods either in the same direction or different directions.

23. In a transmission mechanism of the character described, the combination with a set of change-speed gears, of gear shifting means comprising one or more shifter rods, a pair of gears associated with each rod for operating the same back and forth in push and pull movements, an operator always arranged to be turned in one direction for engaging gears and in the other direction for disengaging the same, means for selectively connecting either of said gears with said operator to be turned thereby, a rack provided on the shifter rod and meshing with one of said gears, and means serving to interconnect the gears so they operate simultaneously but in reverse directions whereby when one gear is connected with the operator and turned thereby the other gear is turned in the opposite direction and push and pull movements are communicated to the rod in the operation of the operator, and vice versa when the other gear is connected with the operator.

24. In a transmission mechanism of the character described, the combination with a set of change-speed gears of gear shifting means comprising a plurality of shifter rods provided with racks, two gears associated with each shifter rod for operating the same, at least one of said gears being meshed with a rack on the rod to communicate push and pull movements when turned back and forth and the other having a reverse connection so as to communicate pull and push movements when turned back and forth like the first gear, a single operator for all of said rods for simultaneously operating a number of rods, means for selectively clutching to the operator certain gears of the plurality of pairs whereby to operate a plurality of shifter rods together either in the same direction or opposite directions, and means for operating said clutching means whereby to select certain shifter rods for operation to secure predetermined drive speeds.

25. In a transmission mechanism of the character described, the combination with a set of change-speed gears, of gear shifting means comprising a plurality of shifter rods, a pair of opposed parallel racks mounted on the end of each of said shifter rods, one of said racks serving to communicate push movements and the other pull movements in the gear engaging movement of said rod, a plurality of pairs of gears arranged coaxially for operation by a common means, there being one pair of gears associated with each pair of racks for each shifter rod, one of the racks meshing with one of the gears on one side of the axis and the other rack meshing with the other gear on the other side of the axis, a sleeve providing a common mounting for the stack of gears, clutching elements operating through openings in said sleeve whereby to clutch a plurality of gears for rotation with said sleeve, only one gear of any pair being clutched at a time, means within said sleeve for operating said clutching elements, and means for rotating said sleeve.

26. In a transmission mechanism of the character described, the combination with a set of change-speed gears, of gear shifting means comprising a plurality of shifter rods, a pair of opposed parallel racks mounted on the end of each of said shifter rods, one of said racks serving to communicate push movements and the other pull movements in the gear engaging movement of said rod, a plurality of pairs of gears arranged coaxially for operation by a common means, there being one pair of gears associated with each pair of racks for each shifter rod, one of the racks meshing with one of the gears on one side of the axis and the other rack meshing with the other gear on the other side of the axis, a sleeve providing a common mounting for the stack of gears, clutching elements operating through openings in said sleeve whereby to clutch a plurality of gears for rotation with said sleeve, only one gear of any pair being clutched at a time, a cylindrical peripherally relieved cam within said sleeve and arranged for rotation with respect thereto to actuate the clutching elements to selectively clutch certain gears for rotation with said sleeve, and means for rotating said sleeve and cam together to operate the gears selected and thereby operate a plurality of shifter rods together either in the same direction or opposite directions.

27. In a structure as set forth in claim 26, wherein the said last mentioned means comprises a selector shaft, a gear fixed thereon, a gear fixed on said cam and meshing with said last mentioned gear, said intermeshing gears serving to rotate said cam relative to said sleeve by rotation of said selector shaft, a yoke on said selector shaft arranged to move endwise with the gear thereon in the endwise movement of said shaft and having rack teeth on one side thereof, and a gear provided on said sleeve and meshing with said rack, said sleeve being rotated with said cam by endwise movement of said selector shaft.

28. In a transmission mechanism of the character described, the combination with a set of change-speed gears, of a single control shaft arranged to be turned to different angularities to select gear trains for different speeds, a single control lever, means operable by a handle on the lever adapted to turn said shaft for selecting certain gears for action, means operable by swinging movement of said lever to communicate endwise movement to said shaft, there being means operated in the endwise movement of said shaft for engaging the gears selected, means rendered operative only after the endwise movement of said shaft to lock the shaft with the lever whereby oscillation of the lever results in oscillation of the shaft, clutching means for transmitting drive to the selected gears, and means rendered operative only after the endwise movement of the shaft arranged to be operated by oscillation of the shaft to operate the clutching means.

29. A transmission mechanism as set forth in claim 28 wherein the clutching means comprises two clutches providing a forward and a reverse drive, the latter being operable by a movement of said control lever in one direction to engage the clutch for the forward drive and being operated by the movement of the control lever in another direction to engage the clutch for the reverse drive, there being an intermediate position of the control lever wherein neither clutch is engaged.

30. In a transmission mechanism of the character described, the combination with a set of change-speed gears, of a single control shaft, means operated by said shaft in the endwise movement thereof for throwing certain selected gears into engagement for operation, clutching means for transmitting drive to the engaged gears, a clutch operating element associated with said last mentioned means, and means operated in the endwise movement of said shaft to engage for operation said clutch operating element whereby power is arranged to be transmitted to the selected gears after the same have been thrown into engagement.

31. In a single lever controlled speed changing mechanism of the character described, the combination with a gear box containing change-speed gears and a single lever control unit therefor, of a single control shaft extending from said unit to said gear box, a single control lever on said unit, means operable by a handle on the lever for turning said shaft to different positions of angularity for different speeds, means at the box operated in the turning of said shaft to select certain gears for action, means at said unit operated in swinging movement of said lever communicating endwise movement to said shaft, means at said gear box operated in the endwise movement of said shaft for throwing the selected gears into engagement, and clutching means at said gear box operable by a further swinging movement of said lever after the engagement of the gears for transmitting power to the engaged gears.

32. In a single lever controlled speed changing mechanism of the character described, the combination with a gear box containing change-speed gears and a single lever control unit therefor, of a single control shaft extending from said unit to said gear box, a single control lever on said unit, means operable by a handle on the lever for turning said shaft to different positions of angularity for different speeds, means at the box operated in the turning of said shaft to select certain gears for action, means at said unit operated in swinging movement of said lever communicating endwise movement to said shaft, means at said gear box operated in the endwise movement of said shaft for throwing the selected gears into engagement, a clutch at the gear box for transmitting power to the engaged gears, an element arranged when operated to operate the clutch, means arranged in the endwise movement of said shaft to come into engagement with said element, said means being arranged to operate said element by turning of the shaft, and means rendered operative after the endwise movement of the shaft for turning said shaft by transverse swinging movement of said lever.

33. In a change-speed transmission of the sliding gear type, the combination with one or more gear elements shiftable in both directions from a neutral position to throw into action different gears to secure different drive speeds, of a single shifter element for each gear element operable in both directions, two members associated with each shifter element, one having connection with said element to communicate push and pull movements thereto when operated back and forth in a predetermined way and the other member having a reverse connection with said element to communicate pull and push movements thereto when operated back and forth in the same way as the first member, a single manually operable control member always arranged to be operated back and forth in one predetermined manner to engage and disengage the gear element, and means for selectively connecting said control member with either of the two shifter element operating members.

34. In a transmission mechanism, the combination with a set of change-speed gears, of means arranged to be manually operated to select different gear trains for different speeds, a single control shaft, a single control lever for operating the same and arranged to communicate both endwise and oscillatory movement to said shaft by back and forth and transverse swinging movement respectively of said lever, means operated by endwise movement of said shaft for throwing the selected gears into action, the return movement of said shaft being arranged to throw the selected gears out of action, and clutching means operable in the oscillatory movement of said shaft to transmit drive to the selected gears.

35. A transmission mechanism as set forth in claim 34 wherein the clutching means comprises two clutches affording a forward and a reverse drive, one of said clutches being engaged in the turning of said shaft caused by the transverse movement of the control lever in one direction and the other being engaged by the turning of said shaft in the other direction caused by the transverse movement of said control lever in the other direction, the intermediate position of said lever corresponding to the disengaged position of both clutches.

36. In a transmission mechanism, the combination with a set of change-speed gears, of a selector shaft arranged to be rotated to different angularities to select gear trains for different speeds, a single control lever mounted for swinging movement, a handle on said lever arranged to be operated independently of movement of the lever and connected with said selector shaft to turn the same to select any desired speed, and clutching means operable in the swinging movement of said control lever to transmit drive to the selected gears.

37. A transmission mechanism as set forth in claim 36 wherein the clutching means comprises two clutches affording a forward and a reverse drive, one of said clutches being engaged in the movement of said control lever in one direction and the other being engaged in the movement of said control lever in the other direction, the intermediate position of said lever corresponding to the disengaged position of both clutches.

38. In a transmission mechanism, the combination with a set of change-speed gears, of a selector shaft arranged to be operated to select gear trains for different speeds, means for operating said shaft to select any desired speed, a single control lever mounted for swinging movement to and from a neutral position, and a pair of clutches to transmit drive to the selected gears, one of said clutches being operable in the swinging movement of said lever in one direction from neutral position and the other clutch being operable in the swinging movement of said lever in the opposite direction from neutral position, the drive secured when one clutch is engaged being in the reverse direction from that secured when the other clutch is engaged.

39. In a transmission mechanism, the combination with a set of change-speed gears, of a selector shaft arranged to be rotated to different angularities to select gear trains for different speeds, a single control lever mounted for swinging movement, means operable by a handle on said lever for turning said shaft to select any desired speed, and clutching means operable in the swinging movement of said lever to transmit drive to the selected gears.

40. In a transmission mechanism, the combination with a set of change-speed gears, of a selector shaft arranged to be turned to different angularities for the selection of gear trains for different speeds, a single control lever mounted for swinging movement, means operable by a handle on said lever for turning said shaft to select any desired speed, means for locking said shaft with the lever whereby the shaft may be oscillated by the swinging movement of said lever, and clutching means operable by oscillation of the shaft after the locking of said shaft with the lever whereby to transmit drive to the selected gears.

41. In a transmission mechanism, a single lever control unit comprising a support, a selector shaft mounted for rotation and endwise movement relative to said support and arranged to be extended to a gear box, a single control lever having a yoke portion mounted for universal pivotal movement with the lever relative to said support and shaft, said shaft being normally free to turn with respect to said yoke but being held against endwise movement relative thereto, means arranged in the swinging movement of said lever about an axis transverse with respect to the axis of the shaft to communicate endwise movement to the latter, and a handle on said lever having connection with said shaft for turning the same.

42. A structure as set forth in claim 41 including means arranged to lock said shaft against turning relative to said yoke after the endwise movement of said shaft, said shaft being thereby arranged to be oscillated by swinging movement of said lever in a transverse direction.

43. A structure as set forth in claim 41 wherein the connection between the handle and the selector shaft comprises a gear fixed on the shaft, another gear meshing therewith, and a shaft connected to the last mentioned gear and extending through the control lever and connected with said handle.

44. A structure as set forth in claim 23 wherein the pair of gears are coaxially arranged and the operator comprises a sleeve serving as a mounting for said gears, the means for selectively connecting either gear with the operator comprising clutching elements operating through openings in said sleeve for selectively clutching either gear for rotation with said sleeve, means within said sleeve for operating different clutching elements in different positions of angularity thereof, and means for turning the last mentioned means.

45. In a transmission mechanism, a single lever control unit comprising a support, a control shaft mounted for rotation and endwise movement relative to said support and arranged to be extended to a gear box, a single control lever having a yoke portion mounted for pivotal movement with the lever relative to said support and shaft on an axis transverse with respect to the axis of the shaft, said shaft being normally free to turn with respect to said yoke but being held against endwise movement relative thereto, means arranged in the swinging movement of said lever about the transverse axis to communicate endwise movement to the shaft, and a handle on said lever having connection with said shaft for turning the same.

46. A structure as set forth in claim 45 including means arranged to lock said shaft against turning relative to said yoke after the endwise movement of said shaft.

47. A structure as set forth in claim 45 wherein the connection between the handle and the selector shaft comprises a gear fixed on the shaft, another gear meshing therewith, and a shaft connected to the last mentioned gear and extending through the control lever and connected with said handle.

In witness of the foregoing I affix my signature.

JUEL L. PETERSON.